US006619597B1

(12) United States Patent
Sheppard

(10) Patent No.: US 6,619,597 B1
(45) Date of Patent: Sep. 16, 2003

(54) KEYBOARD WRIST SUPPORT

(76) Inventor: Robert J. Sheppard, 315 Commonwealth Ave. Unit 6, Boston, MA (US) 02115

( * ) Notice: Subject to any disclaimer, the term of this patent is extended or adjusted under 35 U.S.C. 154(b) by 0 days.

(21) Appl. No.: 09/499,434

(22) Filed: Feb. 7, 2000

Related U.S. Application Data

(63) Continuation-in-part of application No. 09/248,485, filed on Feb. 11, 1999.

(51) Int. Cl.$^7$ .............................. B68G 5/00; G06F 1/16
(52) U.S. Cl. .................... 248/118; 248/118.1; 248/918; 361/680; 361/683
(58) Field of Search .............................. 248/118.1, 118, 248/118.3, 118.5, 918; 400/715; 361/683, 679, 680, 681

(56) References Cited

U.S. PATENT DOCUMENTS

| 4,129,746 A | * | 12/1978 | Lambden ................. 178/18.05 |
| 4,709,972 A | * | 12/1987 | LaBudde et al. ........ 312/208.3 |
| 4,913,390 A | * | 4/1990 | Berke ......................... 248/176 |
| 4,976,407 A | * | 12/1990 | Schwartz et al. ........ 248/118.3 |
| 5,072,905 A | | 12/1991 | Hyatt |
| 5,147,090 A | * | 9/1992 | Mandell et al. ........... 248/118.1 |
| 5,158,256 A | * | 10/1992 | Gross ....................... 248/118.3 |
| 5,188,321 A | * | 2/1993 | Hirschenson et al. ....... 248/118 |
| 5,203,527 A | | 4/1993 | Rubey |
| 5,211,367 A | | 5/1993 | Musculus |
| 5,215,282 A | | 6/1993 | Bonutti |
| 5,219,136 A | | 6/1993 | Hassel et al. |
| 5,247,285 A | | 9/1993 | Yokota et al. |
| 5,346,164 A | * | 9/1994 | Allen ......................... 248/118 |
| 5,347,630 A | | 9/1994 | Ishizawa et al. |
| 5,375,800 A | * | 12/1994 | Wilcox et al. ............. 248/118.1 |
| 5,398,896 A | * | 3/1995 | Terbrack ................... 248/118.5 |
| 5,402,972 A | * | 4/1995 | Schmidt ...................... 248/118 |
| 5,443,320 A | * | 8/1995 | Agata et al. ............. 248/118.1 |
| 5,465,931 A | * | 11/1995 | MacDonald ............. 248/118.3 |
| 5,492,291 A | | 2/1996 | Otani |
| 5,513,824 A | | 5/1996 | Leavitt et al. |
| 5,522,572 A | | 6/1996 | Copeland et al. |
| 5,547,154 A | | 8/1996 | Kirchhoff et al. |
| 5,570,268 A | * | 10/1996 | Selker ....................... 361/680 |
| 5,596,481 A | * | 1/1997 | Liu et al. .................. 361/683 |
| 5,596,482 A | * | 1/1997 | Horikoshi .................. 361/683 |
| 5,709,489 A | | 1/1998 | Ambrose |
| 5,724,224 A | * | 3/1998 | Howell et al. ............. 361/680 |
| 5,818,360 A | * | 10/1998 | Chu et al. ................ 248/118.3 |
| 5,833,378 A | | 11/1998 | Gibson |

(List continued on next page.)

FOREIGN PATENT DOCUMENTS

| GB | 2172852 | 10/1986 |
| JP | 61213912 | 9/1986 |
| JP | 10312232 | 11/1998 |

Primary Examiner—Kimberly Wood
Assistant Examiner—Naschica S. Morrison
(74) Attorney, Agent, or Firm—Daly, Crowley & Mofford, LLP

(57) ABSTRACT

A keyboard wrist support including a platform adapted for being in a first, deployed position adjacent to the keyboard or a second, storage position in a plane below the keyboard. The wrist support further includes a pair of elongated support brackets, each having a first portion coupled to the platform and a second portion movably attached to a base. The wrist support provides the additional benefits of counterbalancing the weight of the computer display when the wrist support is used with a portable computer and providing leverage to the user for stabilization. The platform is pivotable with respect to the support brackets in order to permit the platform to be angled relative to the keyboard for optimum comfort and the base is slidable with respect to the support brackets in order to reduce the footprint of the support when the keyboard is not in use. Also described are embodiments in which the platform is slidable with respect to the keyboard.

3 Claims, 12 Drawing Sheets

U.S. PATENT DOCUMENTS

| | | | | |
|---|---|---|---|---|
| 5,835,344 A | * | 11/1998 | Alexander | 361/683 |
| 5,836,562 A | * | 11/1998 | Danzyger et al. | 248/295.11 |
| 5,895,020 A | * | 4/1999 | Danzyger et al. | 248/295.11 |
| 5,924,666 A | * | 7/1999 | Liu | 248/278.1 |
| D415,745 S | * | 10/1999 | Clark | D14/114 |
| 5,971,332 A | * | 10/1999 | Sun et al. | 248/118 |
| 6,003,446 A | * | 12/1999 | Leibowitz | 108/43 |
| 6,025,986 A | * | 2/2000 | Sternglass et al. | 361/680 |
| 6,027,090 A | * | 2/2000 | Liu | 248/278.1 |
| 6,152,411 A | * | 11/2000 | Lundstrom | 248/291.1 |
| 6,195,255 B1 | * | 2/2001 | Kim | 248/118.1 |
| 6,199,809 B1 | * | 3/2001 | Hung | 248/281.11 |
| 6,216,988 B1 | * | 4/2001 | Hsu et al. | 248/118 |
| 6,226,175 B1 | * | 5/2001 | Murayama et al. | 235/145 R |
| 6,262,716 B1 | * | 7/2001 | Raasch | 248/118 |
| 6,347,771 B1 | * | 2/2002 | Lauzon et al. | 248/118 |
| 6,398,176 B1 | * | 6/2002 | Liu | 108/136 |
| 6,452,791 B2 | * | 9/2002 | Kim | 248/118 |
| 2002/0117588 A1 | * | 8/2002 | Lando | 248/118 |

* cited by examiner

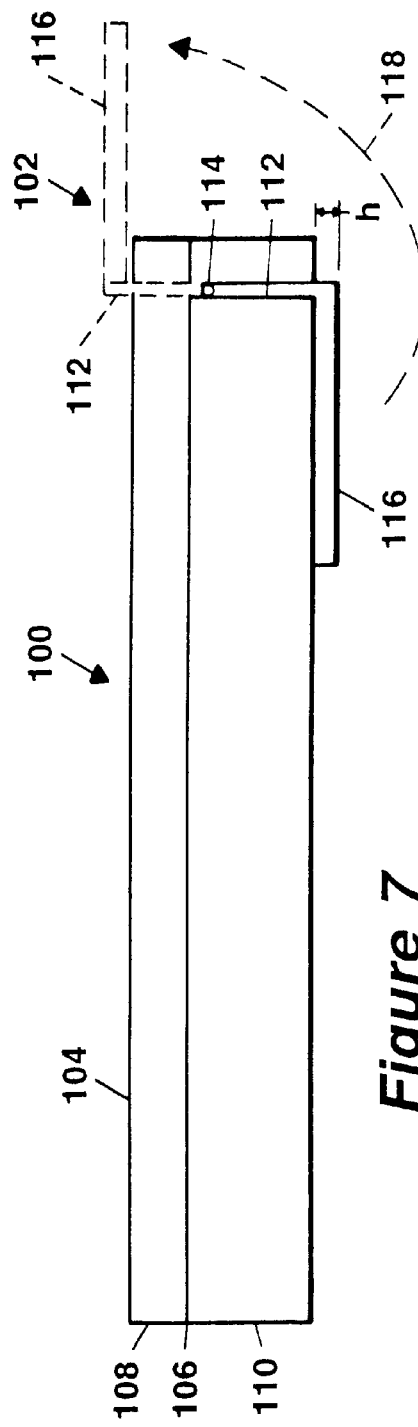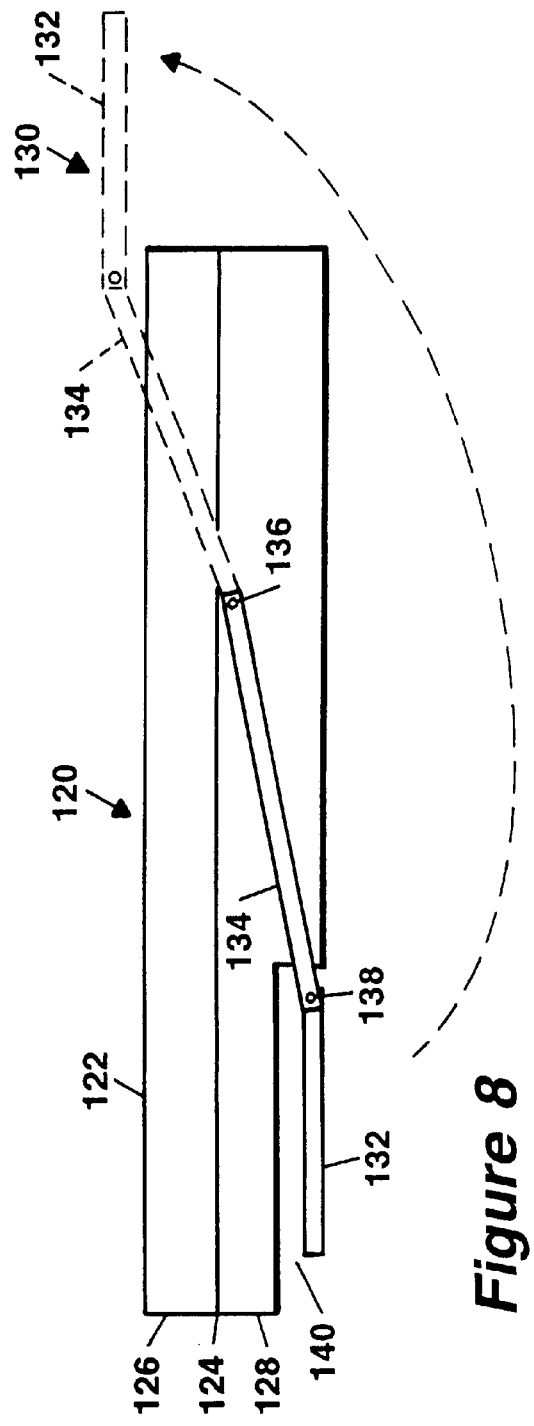

KEYBOARD WRIST SUPPORT

CROSS-REFERENCE TO RELATED APPLICATIONS

This application is a continuation-in-part of U.S. patent application Ser. No. 09/248,485 entitled KEYBOARD WRIST SUPPORT, filed on Feb. 11, 1999.

STATEMENTS REGARDING FEDERALLY SPONSORED RESEARCH

Not applicable.

BACKGROUND OF THE INVENTION

As technology advances continue to permit significant reductions in the size and cost of computer components, portable computers (sometimes referred to as "laptops" or "notebooks") have become increasingly popular. Also responsible for the growing popularity of portable computers is the mobile culture of much of the business community. The relatively small size and light weight of portable computers makes them a valuable part of many businesses since they permit data processing to be accomplished at locations remote from an office with minimal inconvenience.

Keyboards of any type, including those associated with portable computers, non-portable (or "desk top") computers, and even typewriters, are notorious for causing hand and wrist injuries to frequent users due, in large part, to the position of the user's wrists relative to the keyboard. Carpal tunnel syndrome is one such injury in which damage is caused to finger tendons passing through the wrist.

Wrist supports, which are sometimes referred to as palm supports, or rests, can help to minimize and even prevent such injuries by elevating the user's palms and/or wrists with respect to the keyboard. For example, some keyboard operators use a padded support positioned adjacent to the front edge of the keyboard. In fact, many keyboard support trays include an integral padded support positioned adjacent to the front edge of the keyboard in order to elevate the user's palms and wrists. While these conventional wrist supports can be useful in alleviating carpal tunnel syndrome and similar injuries, generally, they are not conducive to portable computers due to their size and bulk.

One keyboard palm rest for a portable computer described in U.S. Pat. No. 5,596,481 to Liu et al. includes a palm support which is pivotable with respect to the computer chassis between a covering position and an elevated, palm support position. Another portable computer palm rest described in U.S. Pat. No. 5,596,482 to Horikoshi includes a palm rest which can be used as both a computer handle and as a palm rest. The Horikoshi palm rest can also be rotated to an upright position for storage under the lid of the computer.

SUMMARY OF THE INVENTION

The invention is directed to a keyboard wrist support for use with both portable computers having integral keyboards and "stand-alone" keyboards of the type typically used with desk top computers. The wrist support includes a pair of support brackets and a platform attached to a first portion of the support brackets to support a user's palms and/or wrists. The platform is adapted to be in a first, wrist support position adjacent to the keyboard when the keyboard is in use or in a second, storage position in a plane below the keyboard. In applications in which the wrist support is used with a portable computer, the platform is positioned below a portion of the computer chassis when in the second, storage position.

In one embodiment, the wrist support further includes a base coupled to the portable computer or stand-alone keyboard. The base is pivotably coupled to a second portion of the support brackets, such as with the use of hinges. With this arrangement, the platform and support brackets are rotatable relative to the base, thereby permitting movement of the platform between the first and second positions.

The platform may be attached to the support brackets in a fixed manner or, alternatively, may be movably attached in order to permit certain position adjustments to be made for maximum user comfort and injury prevention. For example, in one embodiment, the platform is pivotable with respect to the support brackets, thereby enabling the platform to be positioned at a desired angle relative to the keyboard. The platform may also be vertically movable with respect to the support brackets, thereby enabling the platform to be raised and lowered with respect to the keyboard.

The wrist support may be separate from the stand-alone keyboard or portable computer or, alternatively, may be integral with the keyboard structure. For example, in one embodiment, the wrist support is removably attached to the chassis of a portable computer, such as with the use of pins.

The wrist support embodiments described herein advantageously provide wrist comfort and injury prevention benefits without increasing the overall size of the keyboard structure, both in the case of a stand-alone keyboard and a portable computer. This is achieved by moving the wrist support platform to the second, storage position in which the platform is disposed below the plane of the keyboard when the keyboard is not in use.

An additional advantage is achieved when the wrist support is used in conjunction with a portable computer; namely to provide leverage and a counterbalance to the weight of the top portion of the computer chassis containing the display, or screen. In this way, the portable computer becomes more stable and balanced during use. The dimensions and, in particular, the depth of the wrist support platform may be increased in order to enhance the leverage and counterbalance effects of the wrist support.

In accordance with a further aspect of the invention, the platform is slidable with respect to the keyboard when in the first, wrist support position. In one such embodiment, the platform includes a first portion of a sliding mechanism, such as rails, and the support brackets include a second portion of the sliding mechanism, such as complementary grooves within which the platform rails are positioned. In an alternative slidable embodiment, the portable computer chassis includes grooves along opposite edges of the top surface of the chassis which are sized and shaped to receive rails extending from a bottom surface of the platform. With these arrangements, the user can slide the platform closer to or further away from the keyboard to achieve maximum comfort.

BRIEF DESCRIPTION OF THE DRAWINGS

The foregoing features of this invention, as well as the invention itself, may be more fully understood from the following description of the drawings in which:

FIG. 7 shows a portable computer having an integral wrist support according to a further aspect of the invention;

FIG. 8 shows an alternate embodiment of a portable computer having an integral wrist support;

DETAILED DESCRIPTION OF THE INVENTION

Figure 1:
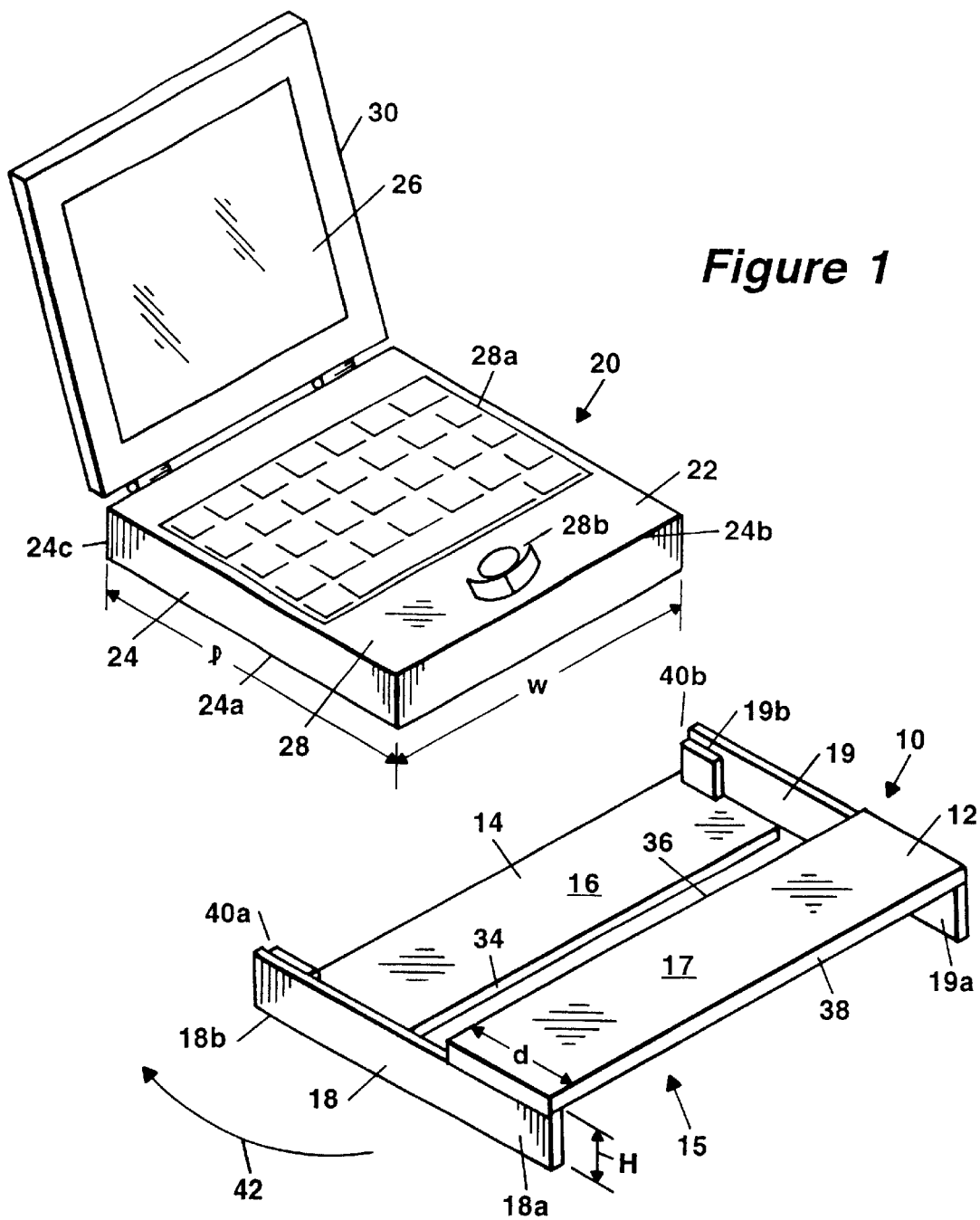
FIG. 1 is an isometric view of a wrist support according to the invention, with the platform in a first, wrist support position.
Figure 2:
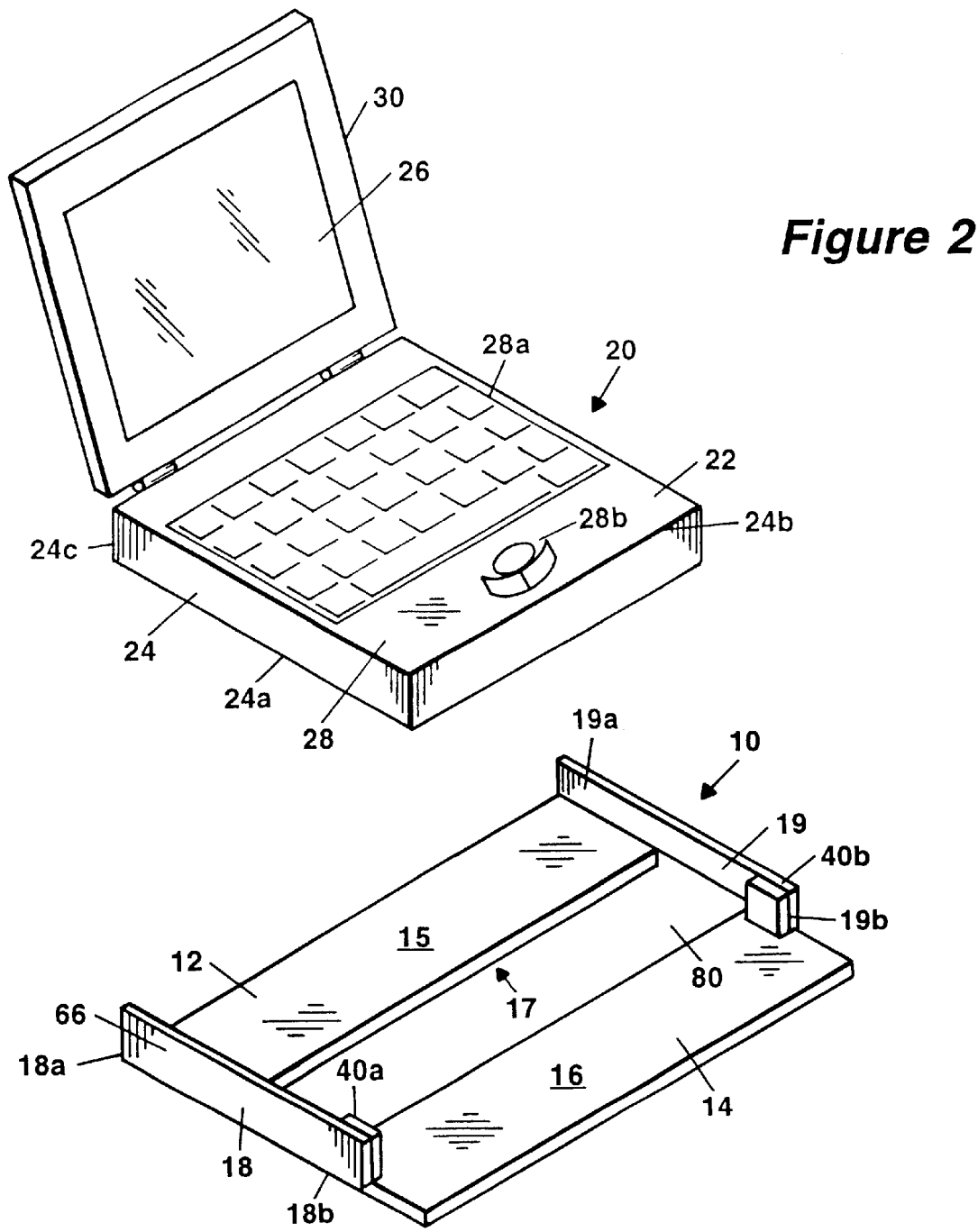
FIG. 2 is an isometric view of the wrist support of FIG. 1 with the platform in a second, storage position.

Referring to FIGS. 1 and 2 in which like elements are designated with like reference numbers, a wrist support 10 according to the invention includes a platform 12 adapted for being in a first, palm or wrist support position, as shown, or in a second, storage position, as shown in FIG. 2 and described below. In the first position, referred to alternatively as the deployed position, the platform 12 is adapted to support the user's palms and/or wrists. While the structures described herein are referred to as wrist supports, it will be appreciated by those of ordinary skill in the art that they also may be accurately referred to as palm supports or rests. The wrist support 10 further includes a pair of elongated support brackets 18, 19, each having a first portion 18a, 19a and a second portion 18b, 19b, respectively, and a base 14. The first and second portions of the support brackets may be located adjacent to, or spaced from respective ends of the brackets.

The platform 12 is coupled to the first portion 18a, 19a of each of the support brackets 18, 19 and the base 14 is coupled to the second portion 18b, 19b of each of the support brackets 18, 19, as shown. More particularly, the base 14 is pivotably attached to the second portion of the support brackets as may be achieved with the use of hinges 40a, 40b. Those of ordinary skill in the art will appreciate that although hinges are shown here, the selection of a particular type of pivotal fastener such as hinges 40a, 40b depends upon a variety of factors including but not limited to cost, ease of manufacture, aesthetics and dimensions of the individual portable computers. In some applications, it may be desirable to provide one or more portions of platform 12 as integral pieces. For example, platform 12 and brackets 18, 19 may be provided as a unitary piece using injection molding techniques.

The wrist support 10 is well suited for use with a portable computer 20 or with a stand-alone keyboard but is illustrated in FIGS. 1 and 2 in use with a portable computer 20. The computer 20 has a chassis 22 in which a keyboard 28 and a display 30 are contained. The keyboard 28 contains a plurality of alphanumeric keys 28a and may also include a mouse 28b or other user interface device. The chassis 22 includes a bottom portion 24 which is movably coupled to the top, or display portion 30 by a hinge so that the keyboard 28 and display 30 can be accessed when the bottom chassis portion 24 and top chassis portion 26 are separated by action of the hinge (i.e., when the portable computer is "open") and so that the keyboard 28 and display 26 can be covered and protected when the bottom chassis portion 24 and top chassis portion 26 abut one another (i.e., when the portable computer is "closed"). The bottom chassis portion 24 has a bottom surface 24a having a length "1" and a width "w" defining the footprint of the computer.

The wrist support 10 is adapted to support the portable computer 20, with at least a portion of the bottom surface 24a of the chassis positioned on the top surface 16 of the base 14. Preferably, the computer is positioned on the base 14 such that the back edge 36 of the platform 12 abuts the front edge 24b of the computer chassis bottom 24. Preferably, the height of the platform 12 is selected to provide the top surface 17 of the platform in or close to the same horizontal plane as the keyboard 28, such as within a few centimeters. In accordance with further aspects of the invention, the platform position may be adjustable, as described below in conjunction with FIGS. 4 and 5. With this arrangement, when portions of the user's palms and/or wrists rest on the top surface 17 of the platform during keyboard operation, stresses on the hands and wrists are advantageously reduced.

In the illustrated embodiment, the portable computer 20 is positioned on the top surface 16 of the base 14, with a front edge 24b of the chassis bottom 24 adjacent to the platform 17. However, it will be appreciated that the computer 20 may be placed in various positions relative to the base 14 and the platform 12. For example, the front edge 24b of the computer chassis bottom 24 may be positioned forward of the front edge 34 of the base, closer to the platform 12 or behind the front edge 34 of the base.

In some instances, it may be desirable to removably secure the computer 20 to the base of the wrist support 10 in order to prevent movement of the computer relative to the wrist support. This removable attachment may be achieved in various ways, such as with the use of a strap, a Velcro™ fastener, a detent mechanism, or an adhesive to hold the computer in place on the wrist support 10.

In use, portions of the palms and/or wrists of the computer operator rest on the platform 12, thereby maintaining a comfortable position relative to the keyboard. Further, an additional benefit to the wrist support 10 is that the base 14 provides additional support and stability for the computer 20 in use. Since portable computers are often placed on a user's lap during use, additional support can be helpful to stabilize the computer in order to prevent it from tipping or otherwise moving on the user's lap. Further, the weight of the top chassis portion 30 may be large relative to the overall weight of the computer, thereby resulting in a tendency of the computer to tilt or tip backwards. When a user places their palms/wrists on the platform, the force applied to the support 10 by the user provides leverage to balance the computer and to counterbalance the weight of the top chassis portion 30.

Furthermore, in some embodiments it may be desirable to weight the support 10 itself so that the wrist support itself provides or aids in providing support, both in the first, deployed position of FIG. 1 as well as in the second, storage position of FIG. 2. In some applications, it may be desirable to increase the depth "d" of the platform beyond that necessary to comfortably support the user's palms and/or wrists in order to provide additional counterbalance to the weight of the display chassis portion 30.

When the wrist support 10 is used with a portable computer which provides access to disk drives, CD-ROM drives, PCMCIA cards, batteries, and other computer peripherals and accessories via the front of the chassis, then the user can access such accessories by reaching below the deployed platform 12. For portable computers in which one or more such accessories are accessible through the sides of the chassis, it may be desirable to minimize the height "H" of the support brackets 18, 19 and thus, to provide the support brackets 18, 19 in the form of relatively thin rods which span only a small portion of the height of the chassis bottom 24. With this arrangement, access to such accessories is possible even when the wrist support is in the first deployed position shown in FIG. 1. Alternatively, openings provided in selected regions of the wrist support can provide access to accessories or portions of the portable computer which may otherwise be blocked. Such openings may be exposed or covered by removable covers.

As noted, the wrist support 10 is also adapted for being in a second, storage position as shown in FIG. 2. The wrist support 10 is moved between the first, deployed position of FIG. 1 and the second, storage position of FIG. 2 by rotating the support brackets 18, 19 and the platform 12 around the pivot point of the hinges 40a, 40b. More particularly, the computer 20 can remain in position on the base 14 while the support brackets 18, 19 and the platform 12 are rotated as shown by arrow 42 (FIG. 1) to provide the arrangement of FIG. 2.

In the storage position, the surface 15 of the platform 12 is positioned under a rear portion of the chassis bottom 24. Preferably, the wrist support components are dimensioned so that, in the storage position, the edge 38 of the platform 12 does not extend past a rear edge 24c of the chassis bottom 24. Thus, the footprint of the wrist support in its stored position is the same as, and possibly smaller than, the footprint of the computer chassis. With this arrangement, the wrist support 10 provides all the benefits of conventional wrist supports, and the additional benefits of leverage and counterbalance, but without affecting the size and thus, portability of the computer 20.

The wrist support 10 may be manufactured from various materials and its components may be comprised of the same or different materials. For example, preferably the platform surface 17 is padded for user comfort. Preferred materials for the wrist support are lightweight and sturdy and include, but are not limited to, plastics, metals, and fiberglass.

Figure 3:
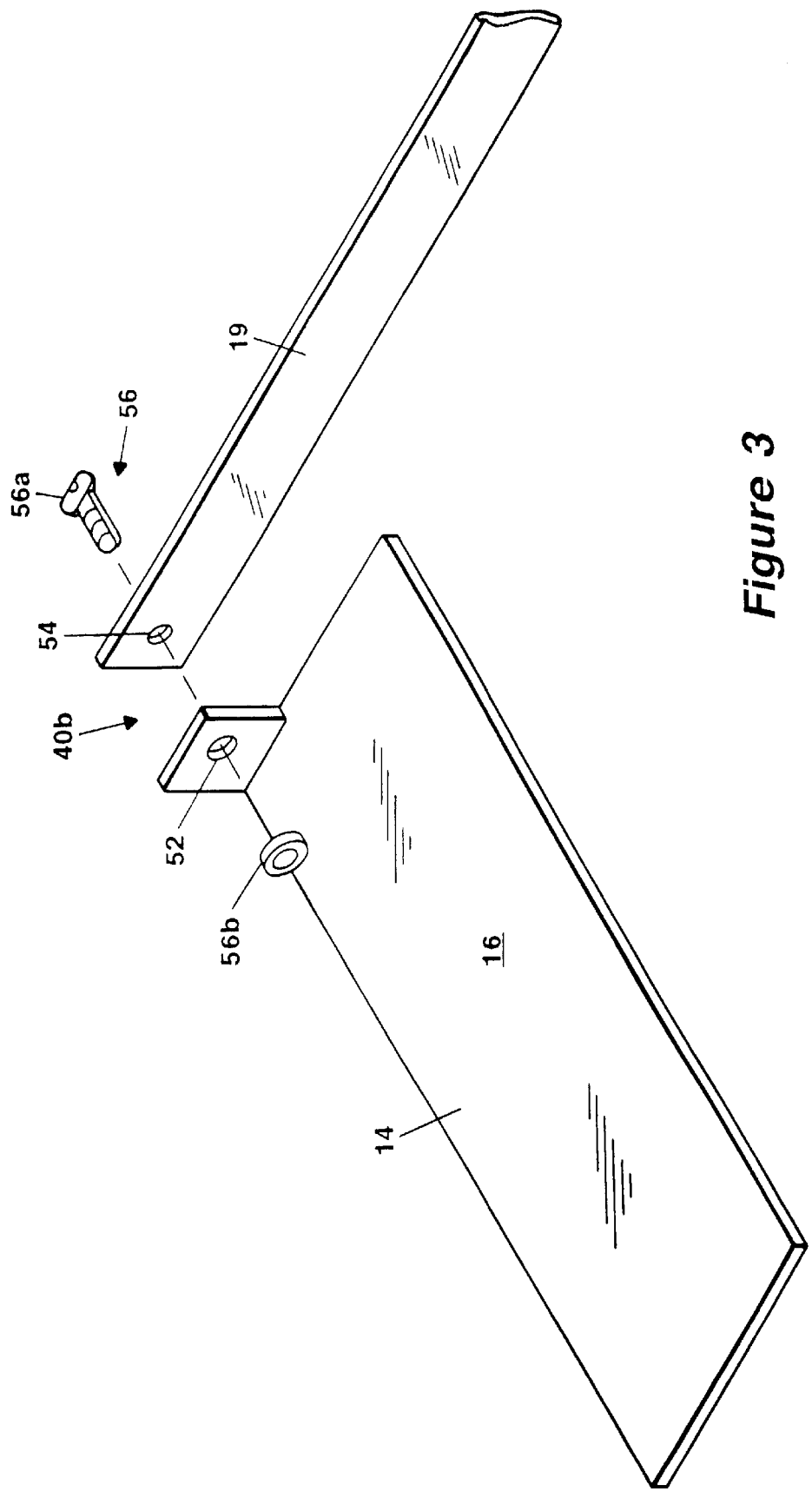
FIG. 3 is an exploded view of an illustrative hinge coupling the base of the wrist support to a support bracket.

The pivotable attachment between the base 14 and the support brackets 18, 19 may be achieved in various ways. Referring also to FIG. 3, illustrative hinge 40b is shown to include a flange 50 extending substantially normal to the base surface 16 and having an aperture 52, a complementary aperture 54 through the support bracket 19, and a fastener 56. In the illustrative embodiment, the fastener 56 includes a screw 56a, which may be a captive screw, and a nut 56b. It will be appreciated by those of ordinary skill in the art however, that the fastener hardware described in conjunction with this and other embodiments may take various forms. For example, members 18, 19 can be coupled to base 14 using a rivet, epoxy, ultrasonic or other bonding techniques, or welding techniques. Typically, captive hardware is preferable in order to prevent the hardware from falling out and being lost.

In assembly, the base 14 and support bracket 19 are aligned so that the base flange aperture 52 is aligned with the support bracket aperture 54. The screw 56a is then guided through the aligned apertures and secured with the nut 56b. The fastener 56 is tightened to an extent sufficient to prevent unassisted movement of the base 14 relative to the support brackets 18, 19 and platform, but also to permit assisted movement of the wrist support between the first and second positions. It will be appreciated by those of ordinary skill in the art however, that various hinge and other types of arrangements are suitable to movably couple the base 14 and the support brackets 18, 19 in such a way that the support brackets 18, 19 and platform 12 can be rotated about an axis 66 to move the platform 12 between the first position of FIG. 1 and the second position of FIG. 2.

The platform 12 may be fixedly attached to the first portions 18a, 19a of the support brackets 18, 19, respectively. Alternatively however, the platform 12 may be movably attached to the support brackets in order to permit certain position adjustments to be made. Such movable attachments include but are not limited to a slotted arm and pin or a linkage type structure.

Figure 4:
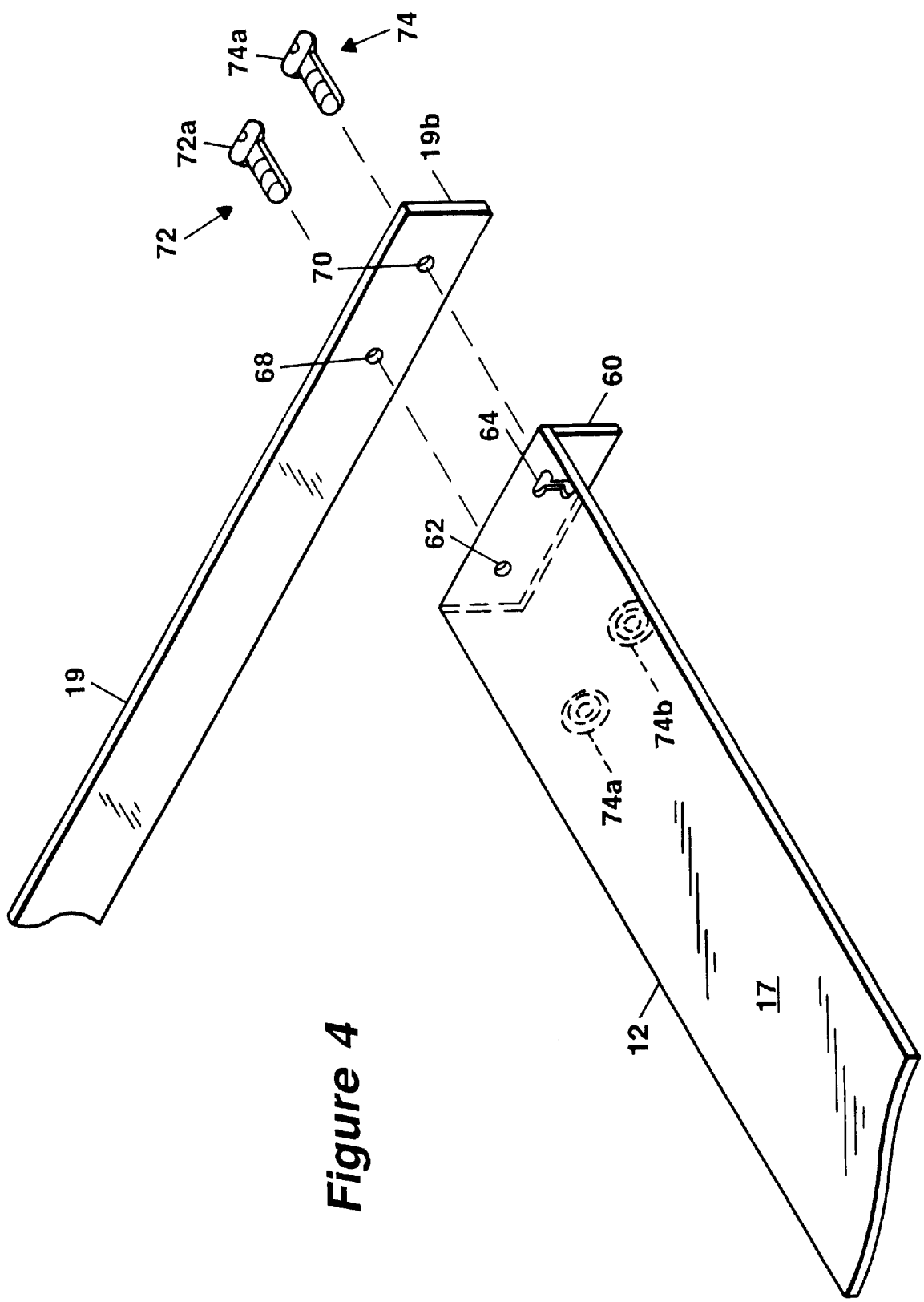
FIG. 4 is an exploded view of the wrist support platform and a support bracket illustrating a pivotable feature of the platform.

Referring also to FIG. 4, a pivotable coupling of the platform 12 to the support brackets 18, 19 is illustrated. The platform 12 includes a flange 60 having a first aperture 62 and a second, elongated aperture 64. The portion 19b of the support bracket 19 to which the platform 12 is attached includes apertures 68, 70, respectively. Also provided are fasteners 72, 74, each including a screw 72a, 74a and a nut 72b, 74b. The platform apertures 62, 64 are aligned with the support bracket apertures 68, 70 and the screws 72a, 74a are guided through the respective apertures. The user can tilt the platform 12 to a desired angle and then tighten the screws 72a, 74a to maintain the desired position. In particular, the screws are tightened to an extent sufficient to prevent the platform from moving from the desired angle, even under the weight of the user's palms and wrists. With this arrangement, the platform surface 17' can be angled relative to the keyboard for maximum comfort. It will be appreciated by those of ordinary skill in the art however, that various arrangements are suitable for movably coupling the platform 12 to the support brackets in order to thereby permit the platform surface 17' to be angled relative to the keyboard.

Figure 5:
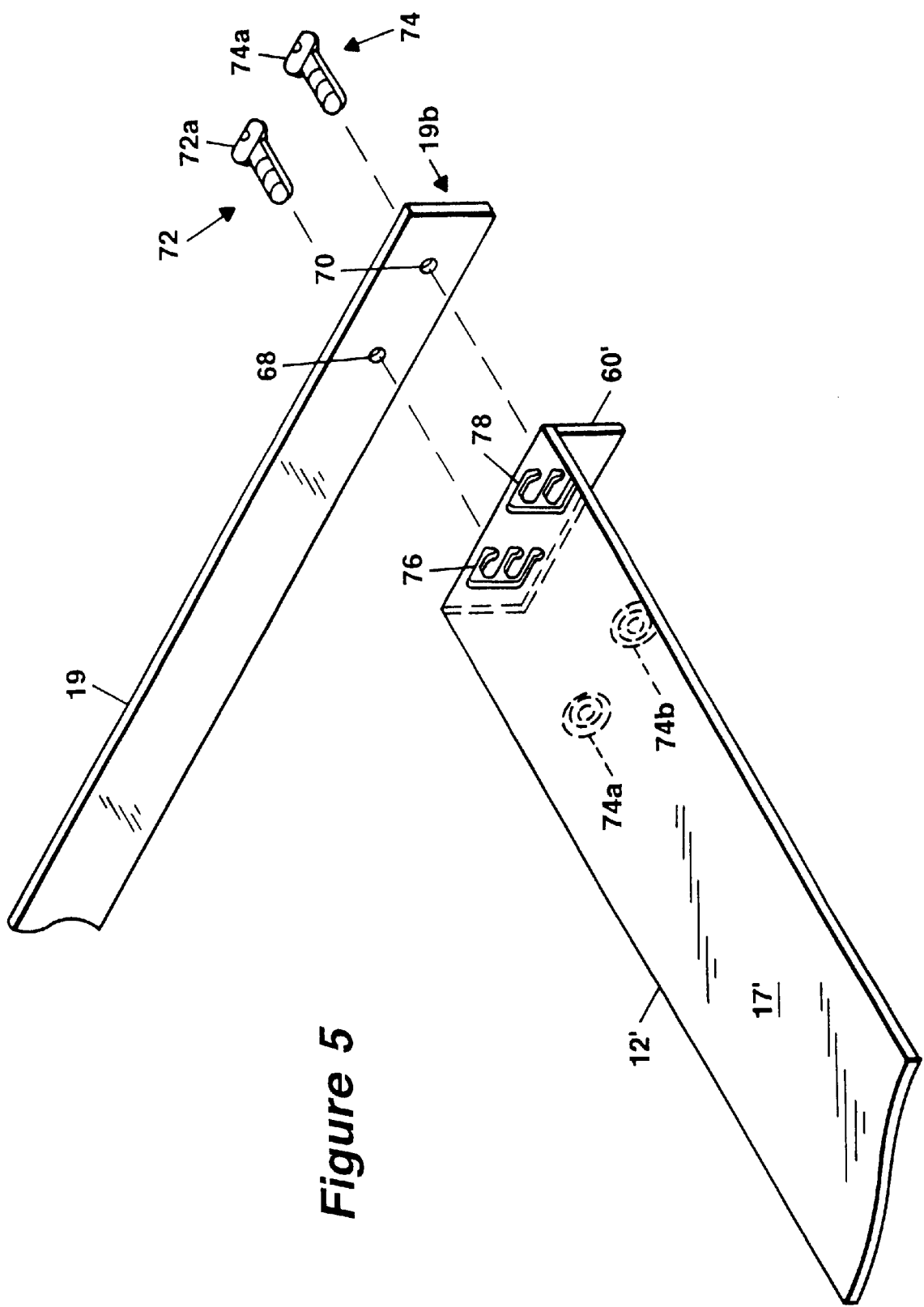
FIG. 5 is an exploded view of an alternate wrist support platform and support bracket illustrating a height adjustability feature of the platform.

Referring to FIG. 5, platform embodiment 12' illustrates a height adjustment feature of the platform. The platform 12' includes a flange 60' having a pair of slots 76, 78. Each of the slots 76, 78 has a pattern which permits the platform to be raised and lowered for maximum comfort.

In use, the platform slots 76, 78 are aligned with the support bracket apertures 68, 70 and the screws 72a, 74a are guided through the respective slots to a user selected position. That is, each of the slots 76, 78 defines a plurality of positions 76a, 76b, 76c and 78a, 78b, 78c, respectively, corresponding to respective height of the platform 12'.

The user selects a desired platform position by moving the platform 12' relative to the support brackets 18, 19 causing the screws 72a, 74a to slide through the slots 76, 78 to one of the slot positions. Once the platform is located in the desired height, the screws are tightened to an extent sufficient to prevent the platform from moving from the desired height, even under the weight of the user's palms and wrists. With this arrangement, the platform surface 17' can be vertically adjusted for maximum comfort. It will be appreciated by those of ordinary skill in the art however, that various arrangements are suitable for movably coupling the platform 12' to the support brackets in order to thereby permit the platform 12' to be raised and lowered relative to the keyboard. Further, it will be appreciated by those of ordinary skill in the art that the pivotable attachment of the platform to the support brackets shown in FIG. 4 may be combined with the vertically movable attachment of the platform and the support brackets shown in FIG. 5 in order to provide a platform that is both pivotable to a desired angle and vertically moveable to a desired height relative to the keyboard. It will also be appreciated that it is within the scope of the present invention to use alternative attachment mechanisms to achieve substantially the same relative motion between the components.

Figure 6:
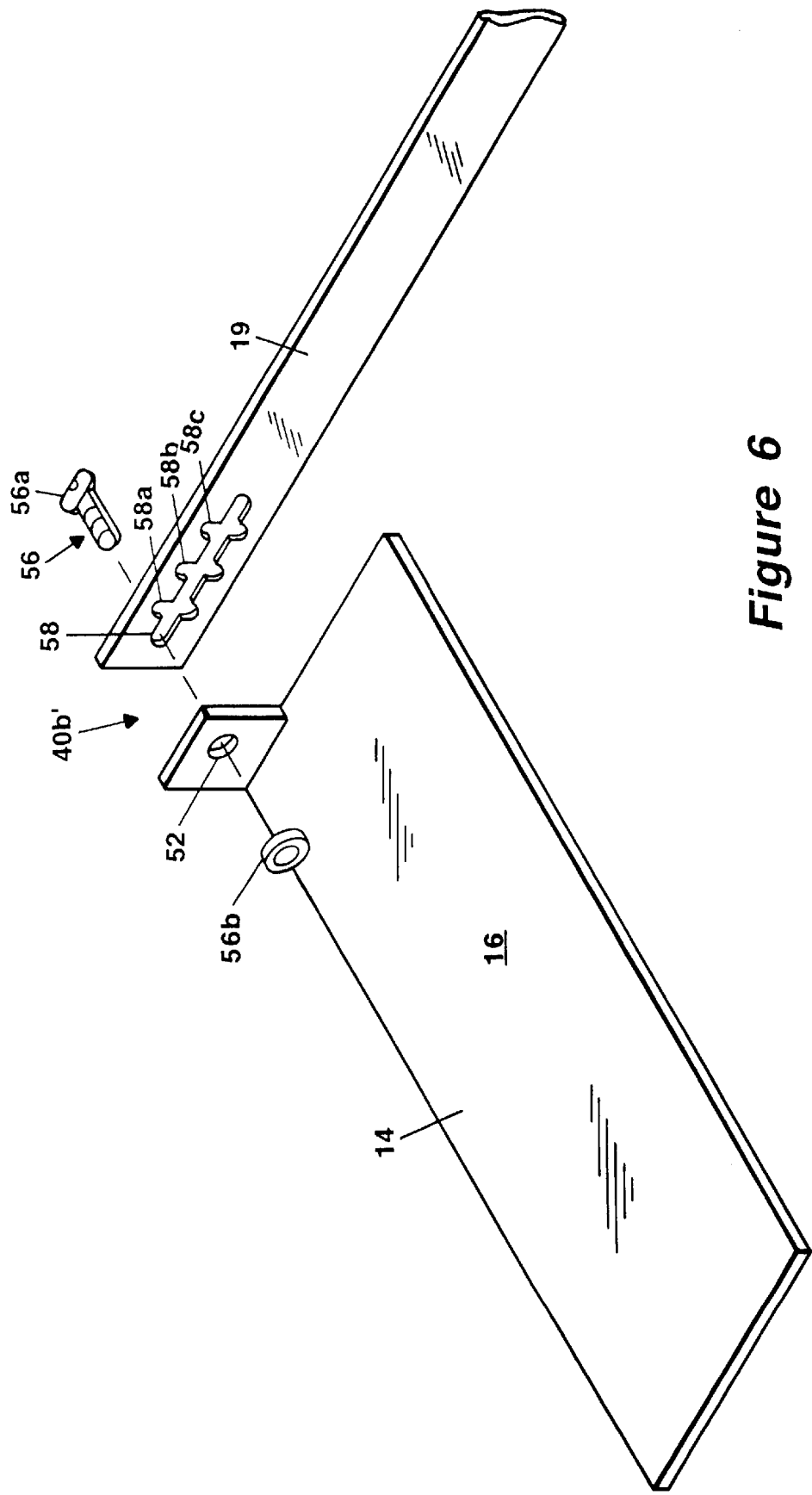
FIG. 6 is an exploded view of the wrist support base and a support bracket illustrating a movable feature of the base.

Referring to FIG. 6, an alternative hinge 40b' for coupling the base 14 to the support brackets is shown. The hinge 40b' differs from the hinge 40b of FIG. 3 in that the aperture at the portion 19b of the support bracket 19 is a horizontally elongated aperture or slot 58 having vertical slot positions 58a, 58b, and 58c. In assembly, the base 14 and support bracket 19 are aligned so that the base flange aperture 52 is aligned with the support bracket aperture 58. The screw 56a is then guided through the aligned apertures and secured with the nut 56b. The elongated bracket aperture 58 permits the base 14 to be slidably moved relative to the support brackets, as is illustrated by the arrow 80 in FIG. 2. This feature advantageously permits the support to be compacted for storage. It will be appreciated by those of ordinary skill in the art, that it may also be desirable to permit the platform 12 to be slidably moved relative to the support brackets in order to even further reduce the footprint of the wrist support 10. The vertical slot positions 58a–58c further permit the base 14 to be moved vertically relative to the support brackets.

Referring to FIG. 7, a portable computer 100 having an integral wrist support 102 is shown. The portable computer 100 has a chassis 104 containing a data processor 81, a keyboard, and a display, as is conventional. The chassis 104 further includes a hinge 106 about which a top chassis portion 108 containing the display rotates relative to the bottom chassis portion 110 to open and close the computer.

The wrist support 102 includes a platform 116, a pair of support brackets 112 (only one of which is shown in the side view of FIG. 7), and a fastener 114. The fastener 114 couples the wrist support 102 to the bottom chassis portion 110 and may take various forms. As one example, the fastener is provided in the form of a pin 114 which extends into the chassis bottom 110. The wrist support 102 may be removably coupled or fixedly attached to the computer chassis. That is, in some instances it may be desirable to permit the computer operator to remove the pins 114 and thereby remove the wrist support 102.

The wrist support 102 is rotatable, as illustrated by arrow 118, about the pin 114 between a first, deployed position (shown in dotted lines) in which the platform 116 is disposed adjacent to the keyboard contained in the chassis bottom 110 and a second, storage position (shown by solid lines). In the storage position, the platform 116 is positioned adjacent to a bottom surface portion of the chassis bottom 110.

With this arrangement, the portable computer 100 is provided with the advantages of a "built in" wrist support, leverage and counterbalance for enhanced stability, but without increasing the footprint of the computer as defined by the length "l" and width "w" of the chassis bottom (see FIG. 1). Only the height of the computer assembly is slightly increased due to the height "h" of the platform. This is achieved by providing a movable wrist support which, in use, is in a first deployed position adjacent to the keyboard and which is capable of being stored in a second position underneath the computer chassis.

Referring to FIG. 8, an alternate embodiment of a portable computer 120 having an integral wrist support 130 is shown. Portable computer 120, like computer 100 of FIG. 7, has a chassis 122 containing a data processor, a keyboard, and a display. The chassis 122 includes a hinge 124 about which a top chassis portion 122 rotates relative to a bottom chassis portion 128 to open and close the computer.

The wrist support 130 includes a platform 132, a pair of support brackets 134 coupled to the platform with a pair of platform fasteners 138 and a pair of chassis fasteners 136. Only one chassis fastener 136, one support bracket 134 and one platform fastener 138 are shown in the side view of FIG. 8. The chassis fastener 136 couples the wrist support 130 to the chassis bottom 128 and may take various forms. In the illustrative embodiment, the chassis fastener 136 is provided in the form of a pin which extends into the chassis bottom. The pin 136 may or may not be removable in order to permit removal of the wrist support 130 from the computer 120.

The wrist support 130 is rotatable about the pin 136, thereby enabling the support to be in a first, deployed position (shown by dotted lines) in which the platform 132 is disposed adjacent to the keyboard contained in the chassis bottom 128 and a second, storage position (shown by solid lines).

The chassis bottom 128 differs from the chassis bottom 110 (FIG. 7) in that the former includes an indentation 140. The platform 132 is positioned in the indentation 140 when the support 130 is in the second, storage position. With this arrangement, the advantages of an integral wrist support which also provides leverage and counterbalance for enhanced stability are provided without increasing the overall dimensions of the computer.

Figure 9:
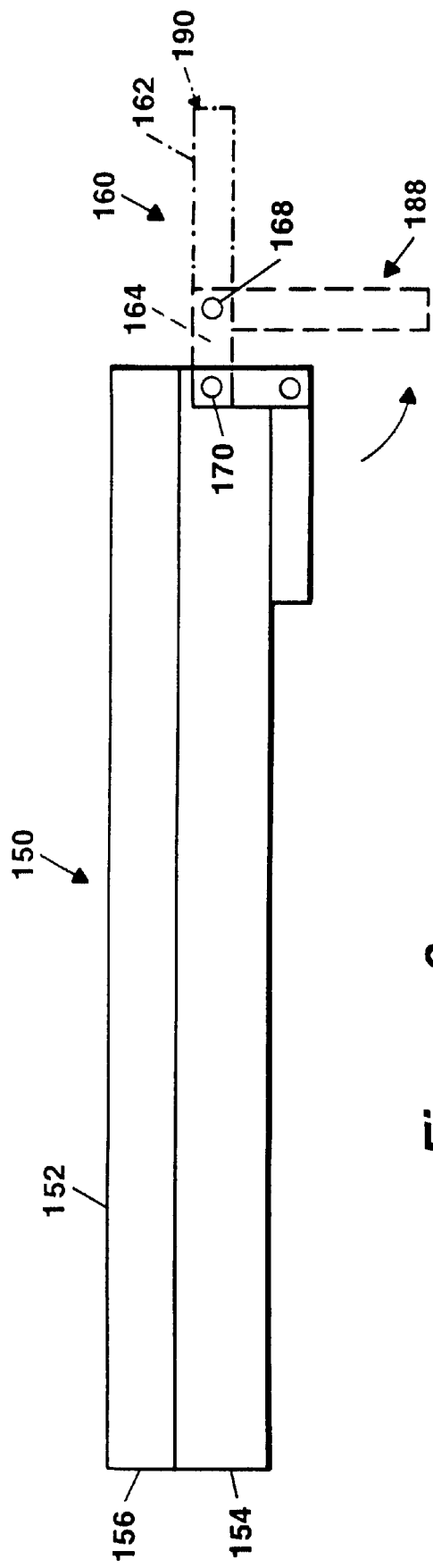
FIG. 9 shows a further alternate embodiment of a portable computer having an integral wrist support.

Referring to FIG. 9, a further alternate embodiment of a portable computer 150 having an integral wrist support 160 is shown. The portable computer 150 is substantially identical to the computer 120 of FIG. 8 and includes a chassis 152 having a bottom portion 154 and a top portion 156.

The wrist support 160 includes a platform 162, a pair of support brackets 164 coupled to the platform with a pair of platform fasteners 168 and a pair of chassis fasteners 170. Only one chassis fastener 170, one support bracket 164 and one platform fastener 168 are shown in the side view of FIG. 9. The chassis fastener 170 couples the wrist support 160 to the chassis bottom 154 and may take various forms. In the illustrative embodiment, the chassis fastener 170 is provided in the form of a pin which extends into the chassis bottom 154. The pin may or may not be removable in order to permit removal of the wrist support 160 from the computer 150.

The wrist support 150 is rotatable about the pin 180, thereby enabling the support to be in a storage position (shown by solid lines) in which the platform is positioned below a portion of the chassis bottom 154 or a deployed position (shown by dotted lines). More particularly, to move the wrist support 160 from the storage position to the deployed position, the platform 162 is rotated outward to an intermediate position labeled 188. The platform 162 can then be rotated relative to the support bracket 164 about the pin 168 to the outward, deployed position labeled 190.

Figure 10:
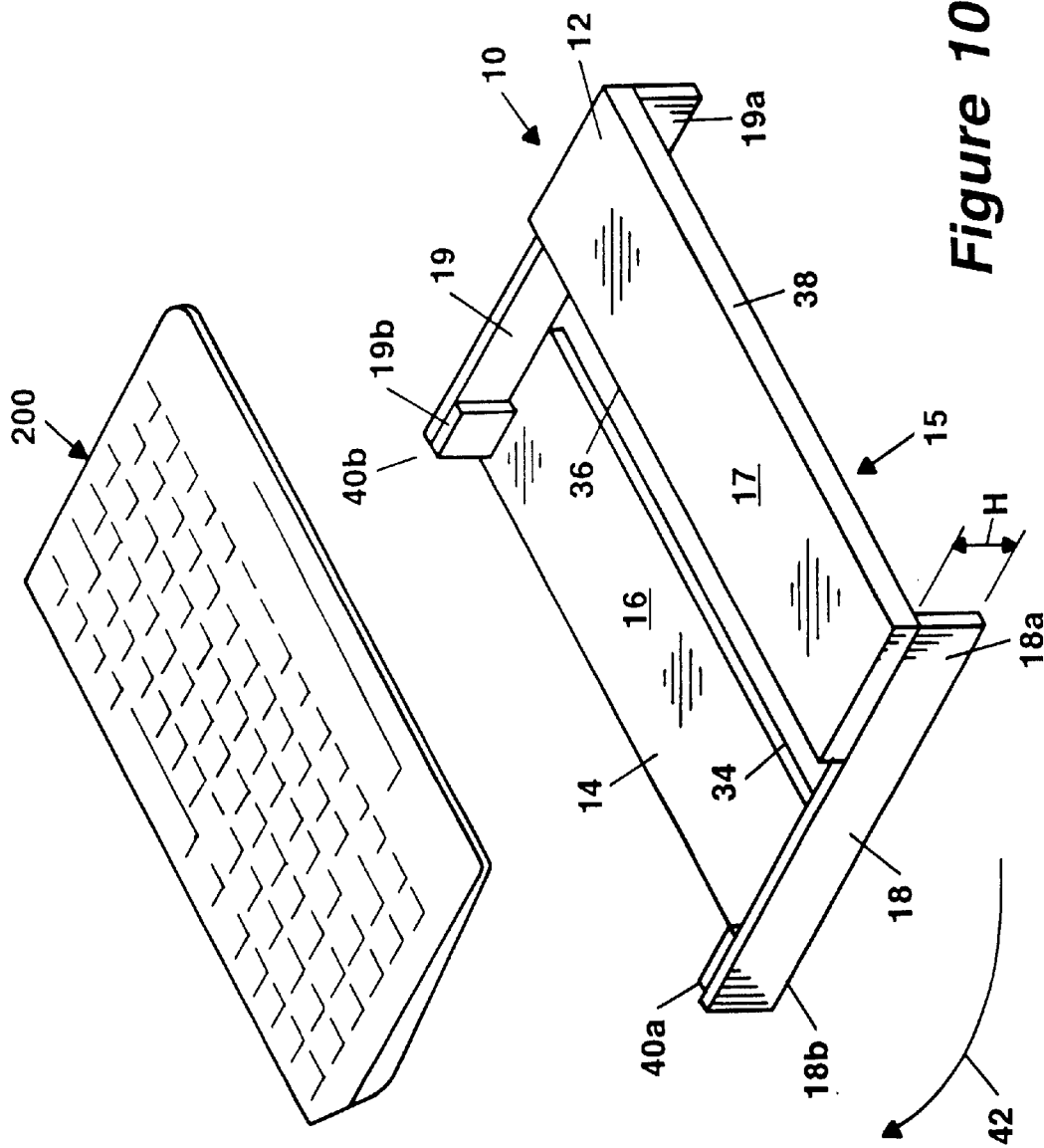
FIG. 10 shows the wrist support of FIGS. 1 and 2 in use with a stand-alone keyboard.

Referring to FIG. 10, the wrist support 10 of FIGS. 1 and 2 is shown for use with a stand-alone keyboard 200. The mode of operation of the wrist support 10 in connection with the keyboard 200 is substantially identical to its use with the portable computer 20 (FIG. 1). In particular, the keyboard 200 is placed on the surface 16 of the base 14 and the user's palms and/or wrists can rest on the surface 17 of the platform 12 when the platform is in the deployed position shown in FIG. 10. When the wrist support is moved to the storage position (FIG. 2), the platform 12 is positioned in a plane below the keyboard 200. As with the portable computer, when used with a stand-alone keyboard 200, the wrist support 10 provides advantageous wrist support benefits (increased user comfort and injury prevention) and also provides leverage to stabilize the keyboard.

Figure 11:
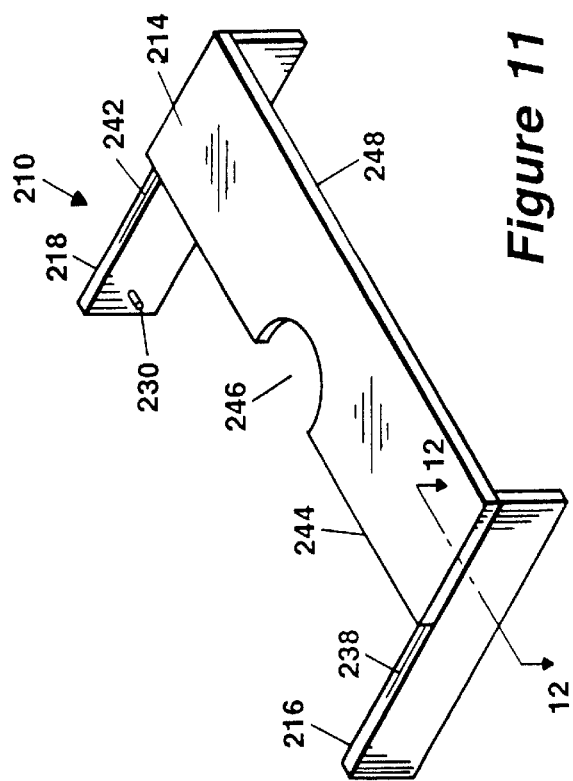
FIG. 11 shows a further alternate wrist support having a slidable wrist support platform.
Figure 12:
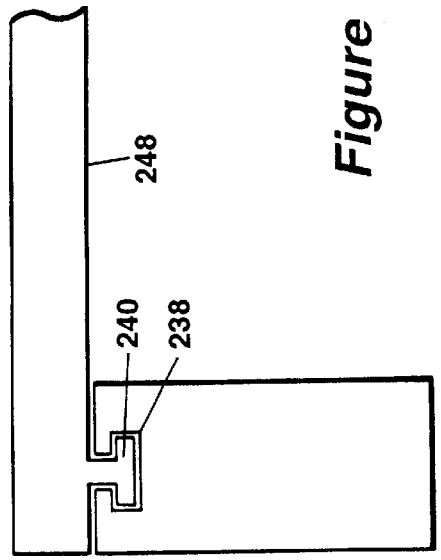
FIG. 12 is an enlarged cross-sectional view of the wrist support of FIG. 11 taken along line 12—12 of FIG. 11.
Figure 13:
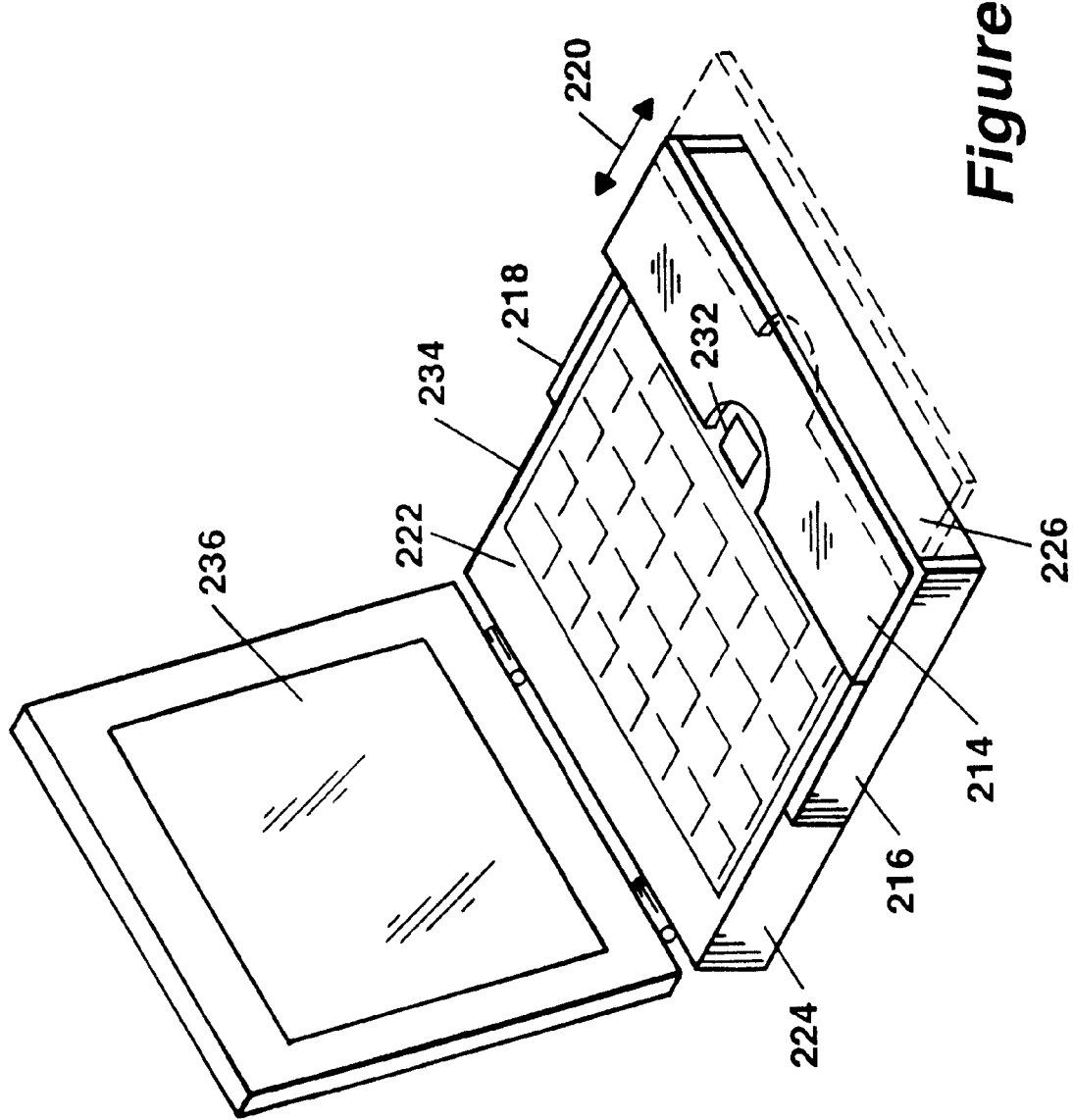
FIG. 13 shows the wrist support of FIG. 11 in use with a portable computer.

Referring to FIGS. 11–13, a further wrist support 210 according to the invention includes a platform 214 and a pair of elongated support brackets 216, 218. The platform 214 is slidably attached to the support brackets 216, 218 in order to permit the platform to be moved in and out along an axis 220 (FIG. 13) relative to a keyboard, such as the illustrated keyboard 222 of a portable computer 224. In some embodiments, the platform can also move between deployed and storage positions as discussed above in conjunction with FIGS. 1 and 2.

The particular location of the brackets and platform are selected such that the platform 214 provides an ergonomically preferred position for a user's hands, wrists and arms. For example, the height of the platform 214 above the keyboard 222 as well as the angle of the top surface of the platform 214 are preferably selected based on ergonomic considerations.

This arrangement advantageously accommodates different preferences amongst users as to the most comfortable distance for one's palms, or wrists to be located with respect to the keyboard 222 as well as different keyboard positions relative to the chassis 234 of the portable computer. That is, different computer manufacturers position the keyboard 222 at different locations within the footprint of the computer chassis. It may be desirable to slide the wrist support inward, toward the open screen, or display 236 when the keyboard is positioned relatively close to the open screen; whereas it may desirable to pull the wrist support outward in cases in which the keyboard is positioned toward the middle of the computer chassis or near its front edge 226.

In applications in which the platform 214 can be moved to a storage position below the computer chassis, each of the support brackets 216, 218 includes a pivot mechanism 230 (FIG. 11) by which the wrist support 210 is movably coupled to the computer chassis 234. In the illustrative embodiment, the pivot mechanism 230 is provided in the form of a pin which is sized and shaped to engage a respective detent in the computer chassis. Like the above-described arrangements, with this particular pivot arrangement, the platform 214 is adapted for being in a first, wrist support position in which the platform is disposed adjacent to the front edge 226 of the computer chassis 234 or in a second, storage position (not shown) in which the platform is disposed below the chassis.

Rails 240, 241 extend from the bottom surface 248 of the platform 214 adjacent to respective edges. The rails 240, 241 are sized and shaped to engage respective grooves 238, 242 in the top edge of support brackets 216, 218, respectively. In use, the rails 240, 241 are movable within the respective grooves 238, 242 to permit the platform 214 to slide relative to the support brackets 216, 218 along axis 220.

It will be appreciated by those of ordinary skill in the art that the rail and groove arrangement shown and described on conjunction with FIGS. 11–13 is one of many possible engagement mechanisms that can be used to achieve sliding engagement of the platform 214 relative to the support brackets and thus, also relative to the computer chassis 234 to which the support brackets are coupled. It will also be appreciated that the location of the sliding mechanism with respect to the support brackets 216, 218 and the platform 214 may be varied. As one example, the platform 214 may have sides overhanging the edges of the support brackets in which the slidable mechanism is positioned.

It will further be appreciated that the forwardmost position of the platform (nearest the open screen 236) and the rearmost position of the platform (furthest from the open screen) can be varied by different techniques. For example, the length of the grooves 238, 242 in the support brackets may be varied. In general, it is desirable that the forwardmost platform position be toward the middle of the chassis (as shown by solid line platform) and that the rearmost position of the platform be such that at least part of the platform extends beyond the forward edge 226 of the chassis (as shown by the dotted line platform). Thus, the platform 214 is movable over and in front of the chassis. The platform 214 is prevented from sliding off of the front edge of the support brackets 216, 218 by a suitable stop mechanism, which may take various forms. As one example, the grooves 238, 242 do not extend quite to the front edge of the respective support brackets 216, 218, thereby preventing the platform 214 from disengaging the support brackets.

An additional feature of the wrist support 210 is provided by a cutout 246 in the rear edge 244 of the platform 214. The cutout 246 permits access to a mouse mechanism, such as the illustrated touch pad 232 (FIG. 13), without requiring that the rear edge 244 of the platform be positioned forward of the mouse mechanism. In this way, maximum flexibility of wrist position relative to the keyboard is provided.

Figure 14:
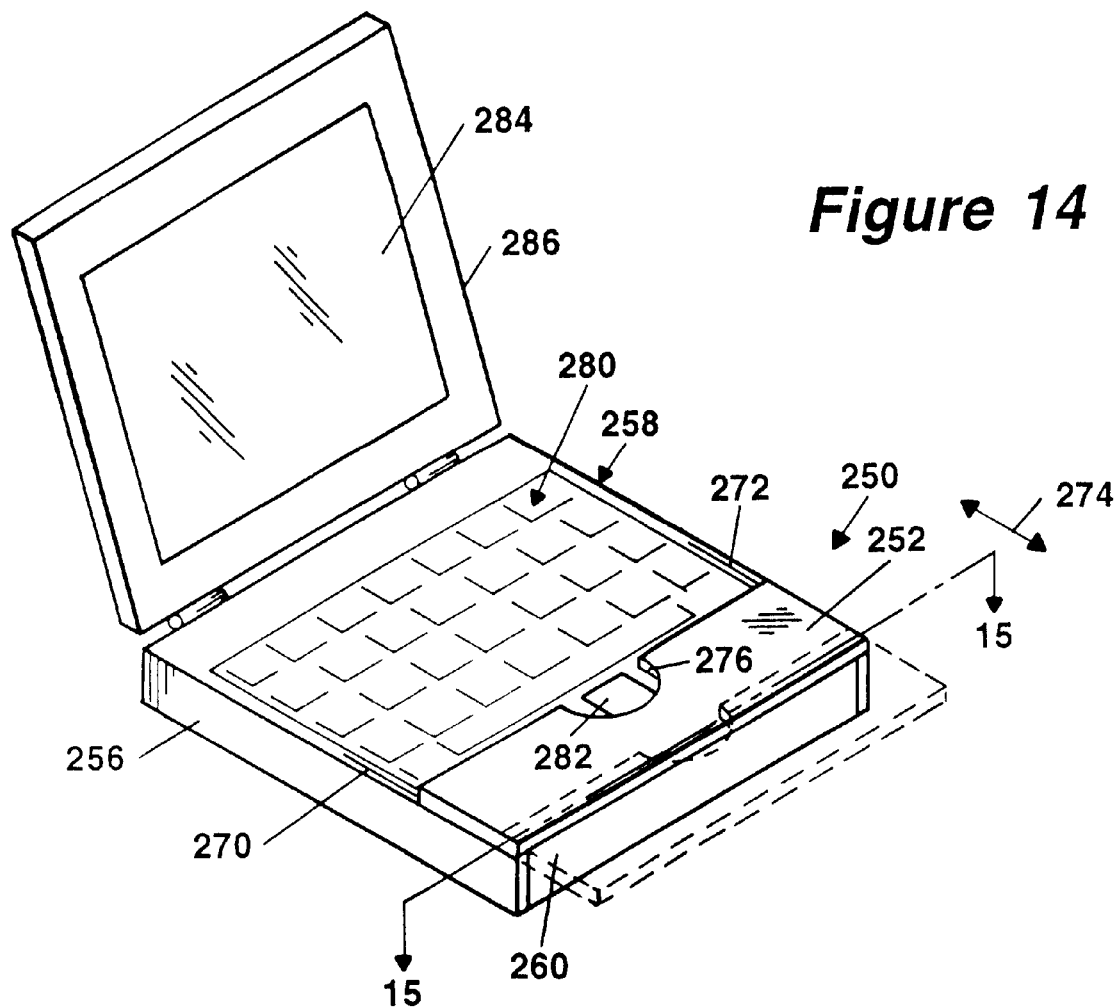
FIG. 14 shows an alternate wrist support embodiment for a portable computer having a slidable wrist support platform.
Figure 15:
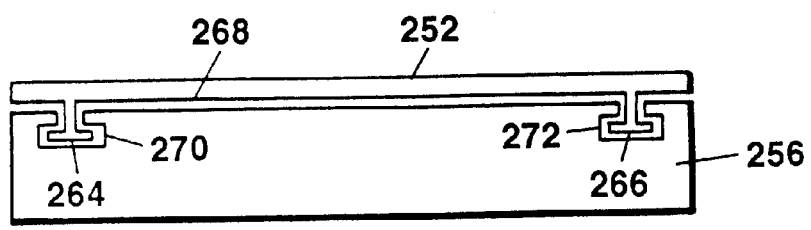
FIG. 15 is a cross-sectional view of the wrist support and computer of FIG. 14 taken along line 15—15 of FIG. 14.

Referring to FIGS. 14 and 15, a further alternate wrist support 250 includes a slidable coupling between the wrist support platform 252 and the chassis 256 of a portable computer 258. The wrist support 250 differs from wrist support 210 of FIGS. 11–13 in that the platform 252 is slidably coupled to the chassis itself (as opposed to being slidably coupled to the support brackets, as in the case of wrist support 210). In embodiments in which it is desirable to have the wrist support 250 movable between a first deployed position and a second storage position, the wrist support may include support brackets (not shown) which are movably coupled to the computer chassis.

A pair of rails 264, 266 extends from the bottom surface 268 of the platform 252 as shown in FIG. 15. Grooves 270, 272 are provided in the top surface of the chassis along either edge, as shown. The platform rails 264, 266 engage respective chassis grooves 270, 272 permitting the platform to be moved in and out along axis 274 in order to permit optimum placement of the user's wrists relative to the keyboard 280 of the portable computer. The platform 252 includes a cutout 276 through which a mouse mechanism 282 can be accessed.

The forwardmost position of the platform 252 (nearest the open screen 284) and the rearmost position of the platform (furthest from the open screen) can be varied by different techniques. For example, the length of the grooves 270, 272 in the chassis may be varied. In general, it is desirable that the forwardmost platform position be toward the middle of the chassis (as shown by solid line platform) and that the rearmost position of the platform be such that at least part of the platform extends beyond the forward edge of the chassis (as shown by the dotted line platform). Thus, the platform 252 is movable over and in front of the chassis. The platform 252 is prevented from sliding off of the front edge 260 of the chassis by a suitable stop mechanism, which may take various forms. As one example, the grooves 270, 272 do not extend quite to the front edge 260 of the chassis, thereby preventing the platform 252 from disengaging the chassis.

The screen 284 may be slightly depressed in order to provide a lip 286 having a height equal to at least the thickness of the platform 252. With this arrangement, the platform 252 is prevented from interfering with the screen 284 when the screen portion of the computer is closed.

The keyboard wrist support 250 of FIGS. 14–15 can be readily adapted for use with a conventional, stand-alone keyboard (like keyboard 200 of FIG. 10). In such an embodiment, the grooves 270, 272 are disposed in the top surface of the keyboard 200 for engagement by respective rails 264, 266 of the platform 252.

It will be appreciated that in all of the above-described embodiments, various factors, such as the thickness of the platform, can be readily varied in order to vary the height of the platform relative to the computer keyboard. For example, in the embodiment of FIGS. 14–15, the top surface of the platform sits above the top surface of the chassis and the keyboard by approximately the thickness of the platform and thus, varying the thickness of the platform will vary the height of the user's wrists relative to the keyboard.

Having described the preferred embodiments of the invention, it will now become apparent to one of ordinary skill in the art that other embodiments incorporating their concepts may be used.

For example, it may be desirable to provide a locking mechanism to permit the wrist support 10 to be locked in either the first, deployed position or the second, storage position in order to prevent inadvertent movement of the wrist support between the two positions.

It is felt therefore that these embodiments should not be limited to disclosed embodiments but rather should be limited only by the spirit and scope of the appended claims. All publications and references cited herein are expressly incorporated herein by reference in their entirety.

What is claimed is:

1. A portable computer comprising:
    a chassis containing a data processor, an alphanumeric keyboard, a display and a support structure; and
    a wrist support comprising a platform adapted to support a user's palms or wrists, wherein said platform is slidably coupled to the support structure in said chassis and wherein, when in use, said wrist support is movable with respect to said keyboard such that said wrist support moves in a plane above a plane in which the keyboard is disposed and said wrist support can move over a surface of said chassis which is in the same plane as the keyboard, and wherein said wrist support is provided having a width substantially equal to the width of said chassis and having a length such that when said wrist support is in a closed position the wrist support covers a surface of said chassis which is in the same plane as the keyboard.

2. The portable computer of claim 1 wherein said platform is disposed in a plane above the plane of the keyboard.

3. The portable computer of claim 1 wherein said platform is slidably coupled to said chassis.

* * * * *